United States Patent [19]

Visser

[11] Patent Number: 4,604,670
[45] Date of Patent: Aug. 5, 1986

[54] MAGNETIC HEAD

[75] Inventor: Eelco G. Visser, Eindhoven, Netherlands

[73] Assignee: U.S. Philips Corporation, New York, N.Y.

[21] Appl. No.: 462,273

[22] Filed: Jan. 31, 1983

[30] Foreign Application Priority Data

Feb. 9, 1982 [NL] Netherlands ............ 8200481

[51] Int. Cl.[4] .............. G11B 5/133; G11B 5/127; G11B 5/187
[52] U.S. Cl. .................. 360/127; 360/113; 360/122; 360/125
[58] Field of Search ........... 360/113, 122, 125, 126, 360/127; 336/218; 29/603; 148/12 EA; 428/611, 928

[56] References Cited

U.S. PATENT DOCUMENTS

| | | | |
|---|---|---|---|
| 2,964,837 | 6/1958 | Harris | 29/155.58 |
| 3,079,470 | 2/1963 | Camras | 179/100.2 |
| 3,182,300 | 5/1965 | Lemke | 340/174.1 |
| 3,232,787 | 2/1966 | Bennett | 360/113 X |
| 3,393,982 | 7/1968 | Fisher et al. | 29/194 |
| 3,674,944 | 7/1972 | Iemura et al. | 179/100.2 |
| 3,824,685 | 7/1974 | Burch et al. | 29/603 |
| 3,931,642 | 1/1976 | Kugimiya et al. | 360/127 |
| 4,242,710 | 12/1980 | Hempstead et al. | 360/113 |
| 4,246,619 | 1/1981 | Hirai et al. | 360/125 |
| 4,394,699 | 7/1983 | Kaminaka et al. | 360/113 |
| 4,409,633 | 10/1983 | Watanabe et al. | 360/127 |

FOREIGN PATENT DOCUMENTS 731581  4/1966  Canada ................ 428/928

OTHER PUBLICATIONS

ITO, "Knoop Hardness Anisotropy and Plastic Deformation in Mn—Zn Ferrite Single Crystals", Journal of the American Ceramic Society, vol. 54, No. 1, Jan. 1971.

Primary Examiner—A. J. Heinz
Assistant Examiner—Benjamin E. Urcia
Attorney, Agent, or Firm—David R. Treacy

[57] ABSTRACT

A magnetic head (1) having a (monocrystalline) core (2) of a magnetizable material which provides a substantially closed path for magnetic flux (B) in write/read operations of the magnetic head (1). In order to provide a magnetic head which has an improved signal-to-noise ratio in particular in the frequency range from 0.5–10 MHz, the magnetizable material of the core (2) shows essentially a uniaxial magnetic anisotropy having an easy axis of magnetization which is transverse to the plane of the path for the magnetic flux. Said orientation of the easy axis of magnetization is produced in one embodiment by coating the faces of the core which are parallel to the path for the magnetic flux with layers of non-magnetizable material which exert a (tensile or compressive) stress in said planes.

9 Claims, 5 Drawing Figures

MAGNETIC HEAD

The invention relates to a magnetic head having a core of a magnetizable ferrite which core provides a substantially closed path for magnetic flux during writing/reading operations of the magnetic head.

Magnetic heads having a core of magnetizable ferrite, for which material in practice (monocrystalline) Mn-Zn ferrite is usually chosen because of its superior combination of resistance to detrition and electro-magnetic properties, are known from U.S. Pat. No. 3,079,470.

A problem associated with the use of cores of monocrystalline Mn-Zn ferrite for magnetic heads and so far not well understood is the phenomenon that, during the reading operations, magnetic noise may occur in the core material as a result of discontinuities in the movements of the magnetic domain walls which are caused by mechanical shocks of the magnetic tape against the magnetic head (termed rubbing noise). It has furthermore been found that as a result of the high magnetic losses of the core material at frequencies above 6 MHz, the present-day Mn-Zn ferrite video heads are less suitable for use in a digital video recorder in which it must be possible to process said signals of 10 MHz.

It is the object of the present invention to provide a magnetic head having a core of a magnetizable material which core has an improved signal-to-noise ratio, in particular, in the frequency range from 0.5 MHz to 10 MHz.

For that purpose, the magnetic head according to the invention is characterized in that the magnetizable ferrite of the core shows a uniaxial magnetic anisotropy having an easy axis of magnetization which is transverse to the plane of the path for the magnetic flux caused by the presence of a mechanical stress in the ferrite of such a value and nature that, with a given crystal anisotropy constant and given magneto-strictive constants of the ferrite, the stress-induced magnetic anisotropy is larger than the crystal anisotropy.

The invention is based on the fact that, when the easy axis of magnetization is oriented in this manner, movements of the magnetic domain walls cannot play a role for the magnetic head. This considerably reduces said rubbing noise.

The anisotropy field of said uniaxial easy axis may also be chosen so that, at frequencies below 10 MHz, no ferromagnetic resonance occurs in the core material and hence a good signal-to-noise ratio can be maintained for frequencies up to 10 MHz.

The desired orientation of the easy axis of magnetization is produced via the magneto-strictive properties of the core materials by producing a mechanical stress in the core. The required mechanical stress in the core material can be realized by ensuring that the faces of the magnetic core which are parallel to the plane of the magnetic flux path (the main faces) are under a mechanical stress. This stress may be both transverse to said planes and parallel to said planes. In both cases, the easy axis of magnetization will direct transversely to said planes and hence transversely to the plane of the magnetic flux path, as a result of the magneto-striction when the correct stress has been produced.

The crystal orientation of the (monocrystalline) core and the value and direction of the mechanical stress to be exerted depend on the magneto-striction constants and the crystal anisotropy constant of the material used. This means, for example, that either a tensile stress or a compressive stress may be necessary to orient the easy axis of magnetization. It has been found that, in the ferrite materials used so far for magnetic heads, the value of the required stresses must lie in the range from approximately 3 to 50 MPa.

A mechanical stress transverse to the main faces of the core can be realized, for example, by exerting a pressure on the main faces by means of a screw, or by gluing the core in a housing by means of an adhesive which exerts a compressive stress or tensile stress on the core. With these methods it is not possible to very accurately adjust the required stress.

The adjustment can be more accurate when the required stress is exerted in the plane of the main faces by providing either a uniaxial (tensile or compressive) stress or a biaxial (tensile or compressive) stress. The advantage of a biaxially oriented stress is that a biaxial stress need be less than a uniaxial stress to obtain the same effect.

A very practical method of providing a biaxial stress of a desired value in the plane of the main faces is to provide on the surfaces in question a material at a higher temperature than that at which the magnetic head is operative and to cool the thus obtained structure, the thermal expansion of said material differing from that of the core material. In order to obtain a tensile stress in the main surface plane of the core, the expansion of the provided material must be lower than that of the core material, in order to obtain a compressive stress it must be higher.

When the core material is ferrite, in particular monocrystalline Mn-Zn ferrite, a desired mechanical tensile stress can be introduced by sputtering layers of glass, Si, $SiO_x$ ($1 \leq x \leq 2$) at a temperature of 200° C. or higher and allowing them to cool. They have a lower coefficient of expansion than ferrite. Si has the advantage that it can be sputtered most rapidly. Most glasses have a higher coefficient of expansion than ferrite and may be used when a compressive stress is to be introduced. The mechanical stresses which should be applied to realize the desired magnetic orientation generally prove to be larger than the mechanical stresses which are introduced by further processing of the core of the magnetic head (for example, producing a winding aperture or gap width-defining recesses by means of a laser). This means that the writing/reading behavior of the magnetic head in accordance with the invention is less dependent on the head technology used than that of conventional magnetic heads.

An embodiment of the invention will be described in greater detail, by way of example, with reference to the drawing.

Figure 1:
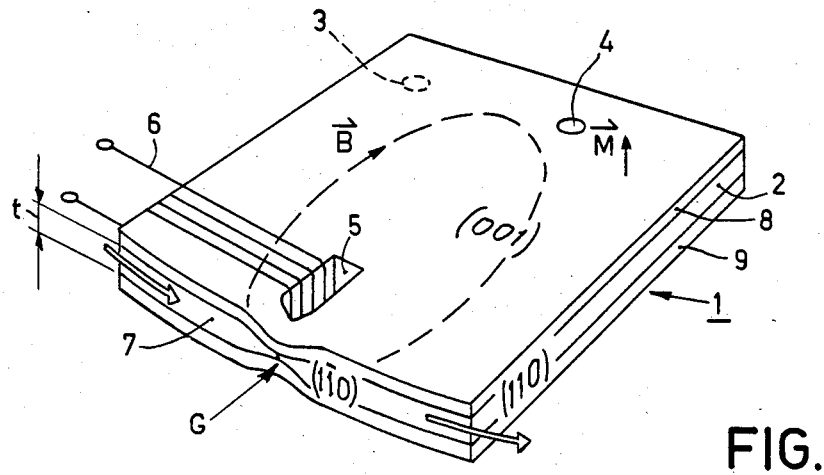
FIG. 1 is a diagrammatic perspective view of a magnetic head.
Figure 2:
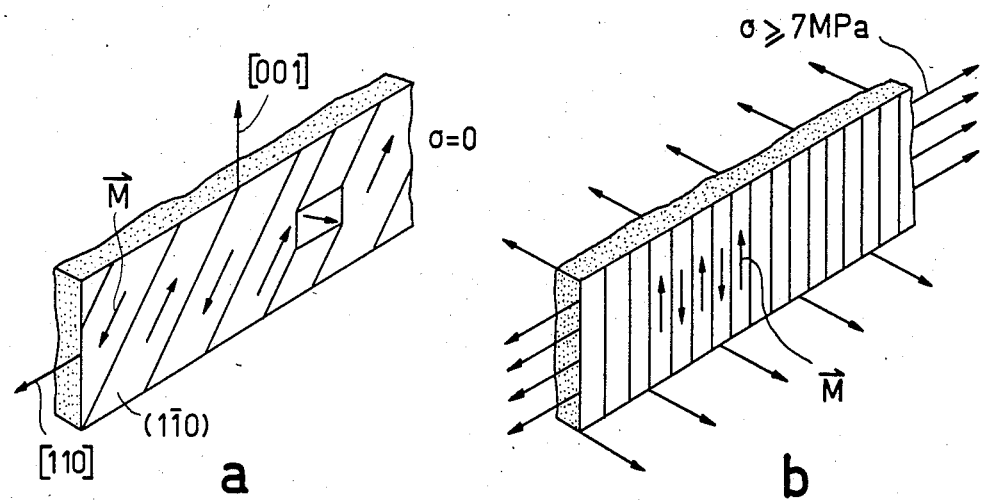
FIG. 2a shows diagrammatically the magnetic domain structure of a part of the tape contact face of a magnetic head on the core of which no mechanical stress is exerted.
FIG. 2b shows diagrammatically the magnetic domain structure of a part of the tape contact face of a magnetic head for the core in which a biaxial tensile stress is exerted in the [001] plane.

FIG. 1 shows diagrammatically a magnetic head of a type which is used in video recorders. Magnetic head 1 comprises a core 2 of a crystalline Mn-Zn ferrous-ferrite (for example a composition which satisfies the formula $Mn_{0.63}Zn_{0.32}Fe^{II}_{0.05}Fe^{III}_2O_4$ which has an anisotropy constant $K_1$ of $-100$ J/m$^3$ at the operating temperature of the head ($\sim 30°$ C.) and magneto-striction constants $\lambda_{100} = -10 \times 10^{-6}$ and $\lambda_{111} = 2 \times 10^{-6}$), which shows two parallel side surfaces 3 and 4. Core 2 has an aperture 5 through which an electric winding 6 is provided. A path for the magnetic flux $\vec{B}$ in the core 2 is denoted by a broken line. The crystal orientation of the monocrystalline Mn-Zn ferrite core 2 is such that the path of the magnetic flux $\vec{B}$ lies in a plane which is parallel to a (001) crystal plane. In the embodiment shown, the core 2 has a tape contact face 7 which is substantially parallel to a ($1\bar{1}0$) crystal plane and a gap surface G which is parallel to a (110) crystal plane. In order to apply a biaxial tensile stress, the (001) oriented main faces (3, 4) of the core 2 are covered by layers 8, 9 of Si provided by means of sputtering. The layers 8, 9 have a thickness of approximately 5$\mu$ against a thickness t of the core 2 of 200 $\mu$m. They are sputtered at a temperature of approximately 300° C. and ensure a biaxial tensile stress in the (001) crystal plane of the core 2 of a value of approximately 12 MPa. Under the influence of said tensile stress, the easy axis of magnetization $\vec{M}$ is oriented at right angles to the (001) planes. This is illustrated with reference to FIGS. 2a and 2b which show the domain structure of a part of the ($1\bar{1}0$) oriented tape contact face of the magnetic head with a monocrystalline Mn-Zn ferrite core of FIG. 1. When no mechanical stress is exerted on the magnetic core, the easy axis of magnetization $\vec{M}$ is along the [111] direction (FIG. 2a), whereas in the case wherein a biaxial tensile stress $\delta$ from approximately 7 MPa is applied in the (001) plane, the easy axis of magnetization $\vec{M}$ will extend transversely to the (001) plane (FIG. 2b). The limit value $\delta_c$ for the biaxial (tensile) stress follows from the formula derived from theory $$\delta_c = \frac{2K_1}{3\lambda_{100}}.$$

Besides by applying a biaxial (tensile) stress in the (001) plane, $\vec{M}$ can also be oriented by applying a uniaxial (tensile) stress along the [110] direction. The limit value for the uniaxial (tensile) stress $\delta'_c$ then follows from the formula $$\delta'_c = \frac{4K_1}{3(\lambda_{100} + \lambda_{111})}.$$

Figure 3:
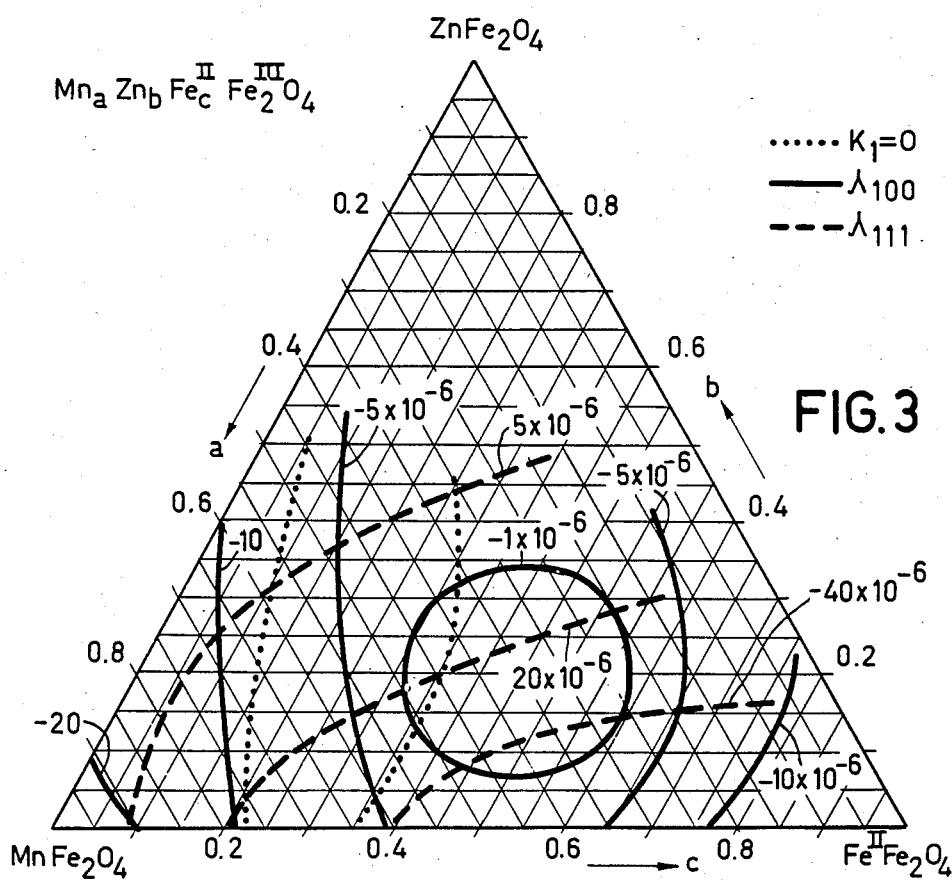
FIG. 3 shows the composition diagram of Mn-Zn ferrite having therein lines connecting points having the same magneto-striction constants $\lambda_{100}$ and $\lambda_{111}$, respectively, and lines connecting points having the same crystal anisotropy constant $K_1(=0)$.

Whether a tensile stress or a compressive stress is to be applied depends on the signs (and the value) of the anisotropy constant and the magneto-strictive constants, i.e. on the choice of the composition of the material. In the case of Mn-Zn-ferrous-ferrite (composition formula $Mn_aZn_bFe^{II}_cFe^{III}_2O_4$), a number of lines connecting points (compositions) having equal $\lambda_{100}$ and $\lambda_{111}$, respectively, and lines with $K_1 = 0$ are presented in the composition diagram of FIG. 3.

The result of the reorientation of the easy axis of magnetization in this manner, as a result of which the mobility of the magnetic domain walls is considerably restricted, proves to be a considerable improvement of the magnetic permeability in the frequency range from 0.5–10 MHz together with a considerable decrease of the magnetic losses in the magnetic core.

Figure 4:
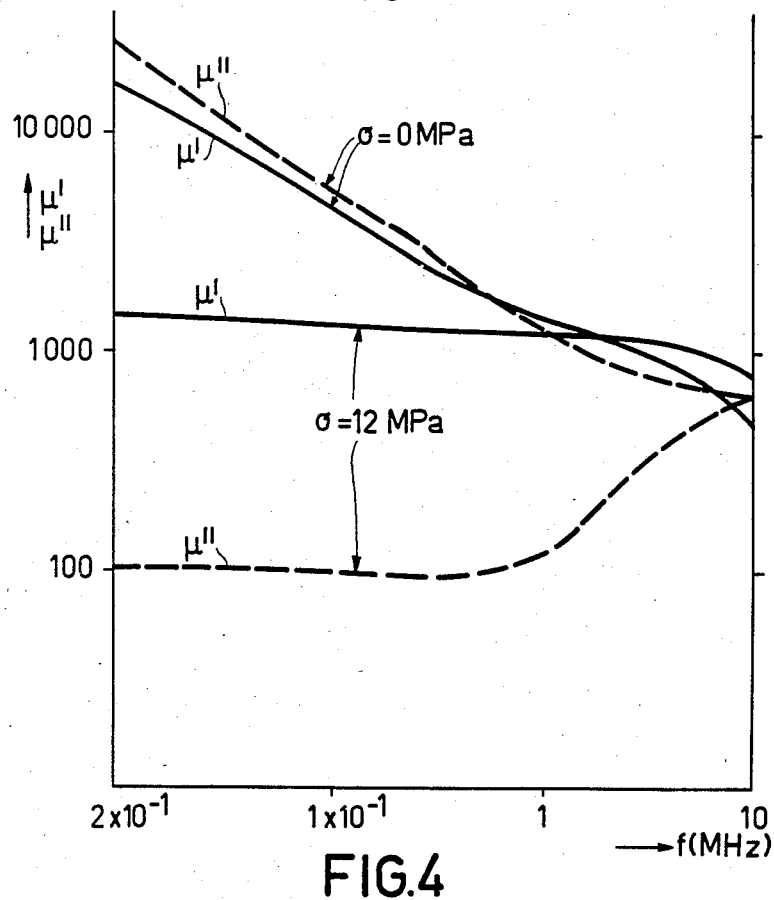
FIG. 4 shows the real component $\mu^1$ and the imaginary component $\mu^{11}$ of the magnetic permeability as a function of the frequency f in MHz of a stress-free magnetic core and a magnetic core under stress.

This improvement is illustrated with reference to FIG. 4 which shows a graph of the real component $\mu'$ and the imaginary component $\mu''$ of the magnetic permeability as they are measured for various frequencies at an annular magnetic core oriented as in FIG. 1. FIG. 4 shows the situation in which the core is unstressed ($\sigma = 0$ MPa) and the improved situation when a biaxial tensile stress $\delta$ of 12 MPa in the (001) plane is introduced in the core. It can also be seen that the magnetic core of the magnetic head in accordance with the invention has such an anisotropy field caused by magneto-elastic interaction that the desired magnetic properties at 10 MHz are realized.

The invention is not restricted to magnetic heads having a core of (monocrystalline) Mn-Zn ferrite. The orientation in the desired manner of the easy axis of magnetization can also be realized in magnetic heads having cores of, for example, (monocrystalline or amorphous) sendust or of (amorphous) alloys based on Ni-Fe.

For Mn-Zn ferrite, the absolute value of the crystal anisotropy $K_1$, which depending on the composition may be between 0 and 150 J/m$^3$, is preferably not larger than 100 J/m$^3$ at the operating temperature of the head (30° to 40° C.). This in connection with the strong dependence of $K_1$ on the temperature. When $K_1$ is fixed, the crystal orientation and the value and the nature of the mechanical stress which is to be introduced are determined on the basis of the magneto-striction constant of the core material. For example, the (001) crystal plane parallel to the magnetic flux path in combination with a biaxial tensile strength in the (001) plane of at least 7 MPa has been chosen in the example. (Biaxial) stresses to a value of 50 MPa can be applied in a controllable manner. This means that in general a material must be chosen for the core having a crystalline anisotropy which is lower than the magneto-strictive anisotropy which can be induced by a stress of 50 MPa. In the case of Mn-Zn ferrite, this means that the absolute values of the anisotropy constant $K_1$ and the magneto-striction constant $\lambda_{xyz}$ of the Mn-Zn ferrite have such a value that the magnitude of the value derived from the relationship, $$\sigma_c = \frac{2K_1}{3\lambda_{xyz}}$$

of the biaxial stress $\sigma_c$ applied in the (xyz) planes of the core (2) parallel to the magnetic flux path is smaller than 50 MPa.

What is claimed is:
1. In a magnetic head comprising
a magnetizable ferrite core for providing a substantially closed planar flux path for magnetic flux during writing or reading operations of the magnetic head, said core having a gap in said flux path and a pair of opposite faces parallel to the plane of said flux path; the improvement wherein the head is of a material having magneto-strictive properties and comprises means for producing a uniaxial magnetic anisotropy in said core having an easy axis of magnetization which is oriented in a direction transverse to said planar path for the magnetic flux, the anistropy producing means including means for applying a mechanical stress to said faces, the mechanical stress being such that the uniaxial magnetic anisotropy is caused by the mechanical stress.

2. A magnetic head as claimed in claim 1, characterized in that the mechanical stress is oriented biaxially.

3. A magnetic head as claimed in claim 2, characterized in that the said faces of the core are covered with a layer of a material having a thermal expansion which differs from that of the material of the core.

4. A magnetic head as claimed in claim 3, characterized in that the said faces are covered with a layer of sputtered material.

5. A magnetic head as claimed in claim 2 or 3, characterized in that the said faces of the core are covered with a layer of a material selected from the group consisting of glass, Si and $SiO_x$ ($1 \leq x \leq 2$).

6. A magnetic head as claimed in claim 1, characterized in that the magnetizable ferrite of the core is a monocrystalline manganese-zinc ferrite.

7. A magnetic head as claimed in claim 6, characterized in that the (001) oriented planes of the Mn-Zn ferrite single crystal are parallel to the magnetic flux path.

8. A magnetic head as claimed in claim 7, characterized in that the absolute values of the anisotropy constant $K_1$ and the magneto-striction constant $\lambda_{xyz}$ of the Mn-Zn ferrite have such a value that the magnitude of the value derived from the relationship $$\sigma_c = \frac{2K_1}{3\lambda_{xyz}}$$

of the biaxial stress $\sigma_c$ applied in the (xyz) planes of the core parallel to the magnetic flux path is smaller than 50 MPa.

9. A magnetic head as claimed in claim 1, wherein the magnetic stress lies in a range of approximately 3 to 50MPa.

* * * * *